(12) United States Patent
Li et al.

(10) Patent No.: US 8,099,623 B1
(45) Date of Patent: Jan. 17, 2012

(54) EFFICIENT DISTRIBUTED HOT SPARING SCHEME IN A PARITY DECLUSTERED RAID ORGANIZATION

(75) Inventors: Yan Li, Sunnyvale, CA (US); Atul Goel, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 294 days.

(21) Appl. No.: 12/247,877

(22) Filed: Oct. 8, 2008

(51) Int. Cl.
*G06F 11/00* (2006.01)

(52) U.S. Cl. .......................... 714/6.22; 714/6.3

(58) Field of Classification Search ............ 714/6, 7, 714/6.3, 6.32
See application file for complete search history.

(56) References Cited

U.S. PATENT DOCUMENTS

| | | | | |
|---|---|---|---|---|
| 5,258,984 A * | 11/1993 | Menon et al. | ............... | 714/6.32 |
| 5,485,571 A * | 1/1996 | Menon | ............... | 714/7 |
| 5,522,031 A * | 5/1996 | Ellis et al. | ............... | 714/6 |
| 5,666,512 A * | 9/1997 | Nelson et al. | ............... | 711/114 |
| 6,851,082 B1 | 2/2005 | Corbett | | |
| 6,976,187 B2 * | 12/2005 | Arnott et al. | ............... | 714/5 |
| 7,058,762 B2 * | 6/2006 | Patterson et al. | ............... | 711/114 |
| 7,120,826 B2 * | 10/2006 | Fore et al. | ............... | 714/7 |
| 7,200,715 B2 | 4/2007 | Kleiman et al. | | |
| 7,610,506 B2 * | 10/2009 | Arai | ............... | 714/6 |
| 7,743,276 B2 * | 6/2010 | Jacobson et al. | ............... | 714/7 |
| 2004/0250161 A1 * | 12/2004 | Patterson | ............... | 714/6 |
| 2006/0075283 A1 * | 4/2006 | Hartung et al. | ............... | 714/5 |
| 2007/0067665 A1 * | 3/2007 | Hashemi | ............... | 714/6 |

OTHER PUBLICATIONS

Holland, et al. "Parity declustering for continuous operation in redundant disk arrays." Dept. of Elec. & Comp. Engr. Carnegie Mellon Univ. Proc. 5th Conf. on Arch. Support for Programming Languages and Operating Systems, 1992.

* cited by examiner

*Primary Examiner* — Yolanda L Wilson
(74) *Attorney, Agent, or Firm* — Perkins Coie LLP

(57) ABSTRACT

A network storage server implements a method to maintain a parity declustered RAID organization with distributed hot sparing. The parity declustered RAID organization, which provides data redundancy for a network storage system, is configured as a RAID organization with a plurality of logical drives. The RAID organization is then distributed in a parity declustered fashion to a plurality of physical drives in the network storage system. The RAID organization also has a spare space pre-allocating on each of the plurality of physical drives. Upon failure of one of the plurality of physical drives, data stored in the failed physical drives can be reconstructed and stored to spare space of the surviving physical drives. After reconstruction, the plurality of logical drives remains parity-declustered on the plurality of surviving physical drives.

16 Claims, 7 Drawing Sheets

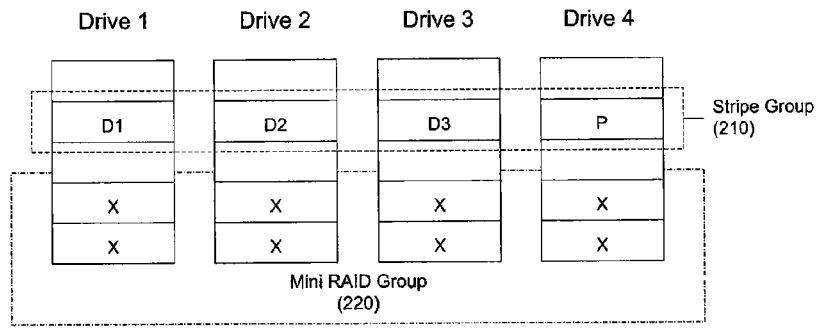
Fig. 2-A
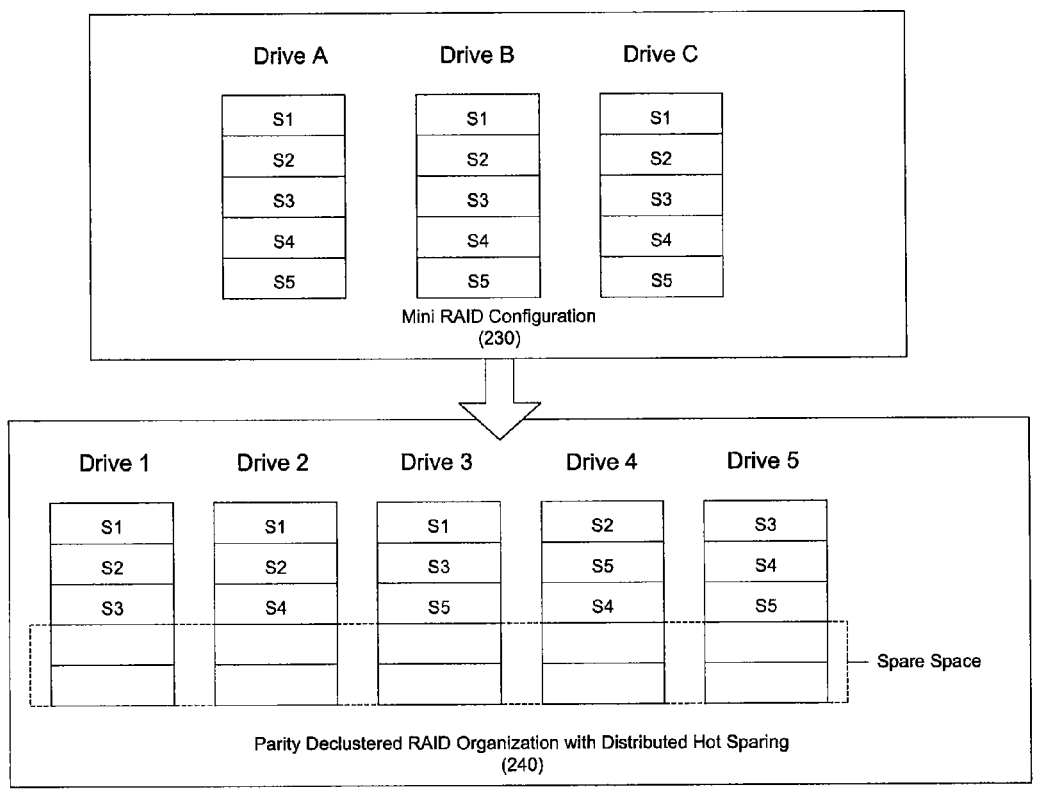
Fig. 2-B

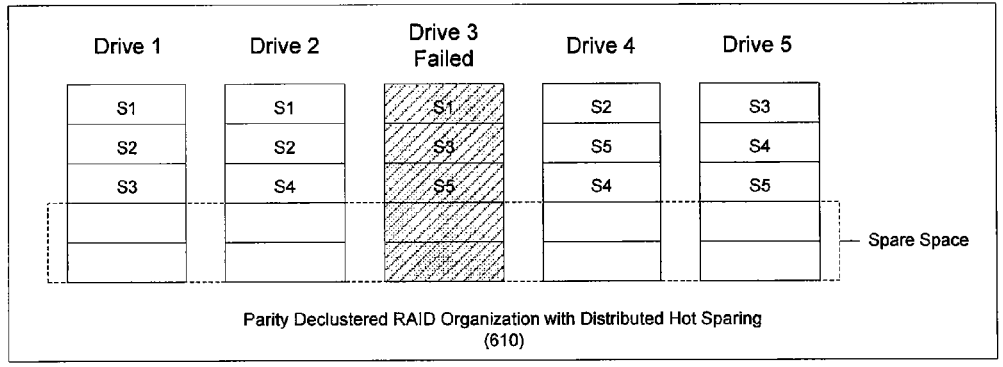

Parity Declustered RAID Organization with Distributed Hot Sparing
(610)

| Stripe Group | Drive Designation |
|---|---|
| S1 | Drive 1, Drive 2, Drive 3 |
| S3 | Drive 1, Drive 3, Drive 5 |
| S5 | Drive 3, Drive 4, Drive 5 |
| | |

Table 620

| Stripe Unit | Complement Drives |
|---|---|
| S1-3 | Drive 4, Drive 5 |
| S3-3 | Drive 2, Drive 4 |
| S5-3 | Drive 1, Drive 2 |
| | |

Table 630

| Surviving Drives | Reconstruct Units |
|---|---|
| Drive 1 | S5-3 |
| Drive 2 | S3-3, S5-3 |
| Drive 4 | S1-3, S3-3 |
| Drive 5 | S1-3 |

Table 640

| Surviving Drives | Assigned Units |
|---|---|
| Drive 1 | S5-3 |
| Drive 2 | S3-3 |
| Drive 4 | S1-3 |
| Drive 5 | |

Table 650

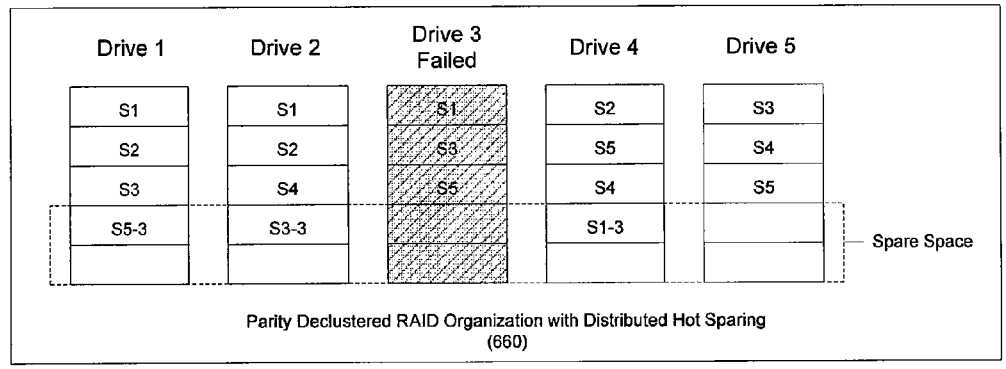

Parity Declustered RAID Organization with Distributed Hot Sparing
(660)

Fig. 6

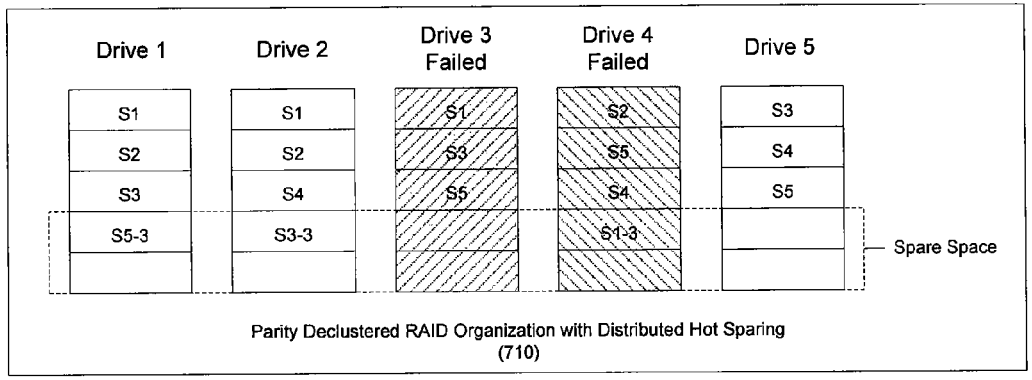
| Stripe Group | Drive Designation |
|---|---|
| S1 | Drive 1, Drive 2, Drive 4 |
| S2 | Drive 1, Drive 2, Drive 4 |
| S4 | Drive 2, Drive 4, Drive 5 |
| S5 | Drive 1, Drive 4, Drive 5 |
Table 720
| Stripe Unit | Complement Drives |
|---|---|
| S1-3 | Drive 5 |
| S2-4 | Drive 5 |
| S4-4 | Drive 1 |
| S5-4 | Drive 2 |
Table 730
| Surviving Drives | Reconstruct Units |
|---|---|
| Drive 1 | S4-4 |
| Drive 2 | S5-4 |
| Drive 5 | S1-3, S2-4 |
Table 740
| Surviving Drives | Assigned Units |
|---|---|
| Drive 1 | S4-4 |
| Drive 2 | S5-4 |
| Drive 5 | S1-3, S2-4 |
Table 750
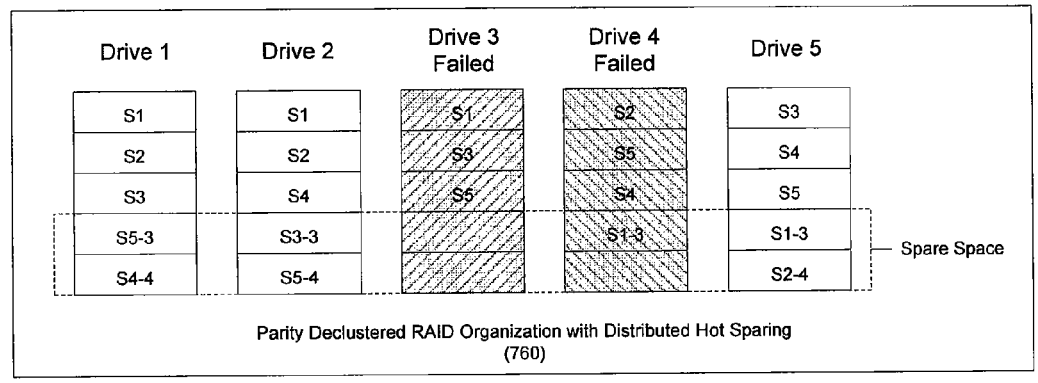
Fig. 7

EFFICIENT DISTRIBUTED HOT SPARING SCHEME IN A PARITY DECLUSTERED RAID ORGANIZATION

FIELD OF THE INVENTION

At least one embodiment of the present invention pertains to network storage systems, and more particularly, to an efficient distributed hot sparing scheme in a parity declustered RAID organization.

BACKGROUND

A storage server is a computer system and a form of storage controller that is used to store and retrieve data on behalf of one or more clients on a network. A storage server operates on behalf of one or more clients to store and manage data in a set of mass storage devices, such as magnetic or optical storage-based disks or tapes. A storage server may be configured to service file-level requests from clients, as in the case of file servers used in a Network Attached Storage (NAS) environment. Alternatively, a storage server may be configured to service block-level requests from clients, as done by storage servers used in a Storage Area Network (SAN) environment. Further, some storage servers are capable of servicing both file-level and block-level requests, as done by certain storage servers made by NetApp®, Inc. of Sunnyvale, Calif.

In conventional network storage systems, the mass storage devices may be organized into one or more groups of drives. Redundant Array of Inexpensive/Independent Disks (RAID) is a technique using the one or more groups of disk drives in a way to achieve greater level of performance and reliability. In a RAID organization of drives, data can be divided and distributed to multiple physical disks. The distribution of data increases input/output throughputs since multiple disks simultaneously participate in the reading and writing of the data. Data can also be replicated in a RAID organization. Replication ensures that data remain available even if one of the disks fails. Such replication of data is often called data redundancy.

When a set of disk drives is configured under a RAID scheme, the set of disk drives is commonly referred to as a RAID group. There are multiple RAID schemes available, each of which has its own distinctive features. For example, RAID 0 (striped disks) increases input/output throughputs by distributing data across several disks. However, since there is no redundancy in level 0 RAID, data would be lost if any one of the disks fails. In a RAID 1 (mirrored disks) configuration, a piece of data can be duplicated to two or more disks. Thus, data would not be lost as long as there is one disk available. Still, RAID 1 scheme is less efficient in storage usage since only half of the available space can be used for data.

For a RAID scheme with data redundancy capability, data is not lost as long as there are enough disks available for failure recovery. When a disk failure is detected by a storage device, a RAID storage system can immediately switch to a degraded state. In the degraded state, data remain available and data services can still be maintained. But the performance of the RAID storage system is greatly reduced since constant calculation is required to derive data from the surviving disks. To restore the RAID storage system to a normal state, an operator could replace the failed disks either by hot-swapping (replacing the disks without powering down the system), or by cold-swapping (replacing the disks after the system is powered off). After the failed disks are replaced, a RAID system is capable of automatically rebuilding the data on the failed disk. Data redundancy can be reinstated when data originally stored in the failed disks are reconstructed or restored on the replacement disks.

When a RAID system operates in a degraded state, the speed of reconstruction becomes crucial, especially since any additional disk failure could cause permanent data loss. Often the RAID system must await the replacement of the failed disks before being able to reconstruct data to the replacement disks. Once reconstruction started, the RAID system allocates a significant amount of system resources to the reconstruction process. As a result, the reconstruction process further reduces the performance of the RAID system which is already operating in a degraded state. In addition, reconstruction often takes a long time to complete. Thus, even a hot spare disk, which is pre-configured as a replacement disk, would not help much in reducing the reconstruction time.

The reason for the long recovery process is due to the limited I/O bandwidth provided by the replacement disks and/or the surviving disks. For example, in a RAID 4 configuration, a dedicated disk maintains parity information for all other disks. If this dedicated disk fails, then data reconstruction, which is to rebuild and store parity onto the dedicated disk, is limited by the write bandwidth of the disk. Similarly, since all disks are required in providing redundant data, the data reconstruction is also limited by the collective read bandwidth of all the surviving disks.

BRIEF DESCRIPTION OF THE DRAWINGS

One or more embodiments of the present invention are illustrated by way of example and not limitation in the figures of the accompanying drawings, in which like references indicate similar elements and in which:

FIG. 2-A illustrates examples of RAID groups and mini RAID groups;

FIG. 2-B illustrates a parity declustered RAID organization with distributed hot sparing;

FIG. 6 illustrates a distributed hot spare assignment scenario in which a disk failure occurred; and FIG. 7 illustrates a distributed hot spare assignment scenario in which a second disk failure occurred.

DETAILED DESCRIPTION

Figure 1:
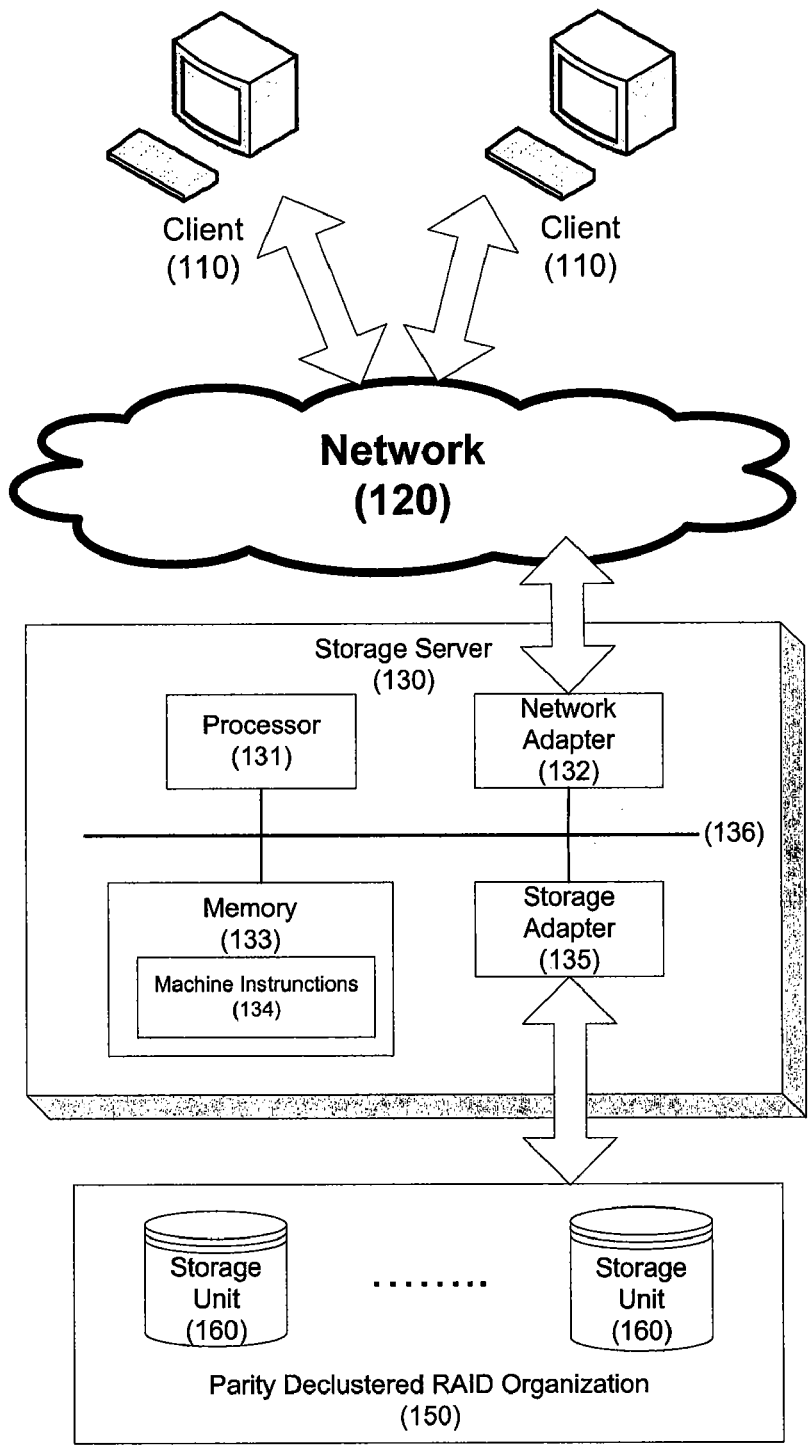
FIG. 1 illustrates a network storage system in which the present invention can be implemented.

A method and apparatus for providing a parity declustered RAID organization with distributed hot sparing scheme are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment, nor are they necessarily mutually exclusive.

To improve the performance of a RAID system during failure recovery, and reduce the time the RAID system needs to spend in a degraded state, a set of drives configured with the RAID system is perceived as a set of "logical drives." And this set of logical drives can be implemented with a greater number of physical drives. During failure recovery, the extra physical drives can be used to offload some of the I/O traffics, thereby greatly reducing the read and write bandwidth bottlenecks that are commonly present during a traditional RAID system recovery. Further, instead of relying on a dedicated hot sparing drive for data reconstruction, each of the physical drives reserves a hot spare space to be used during data reconstruction. Thus, the bottlenecks in data reconstruction can be further reduced.

In one embodiment, a RAID group, or a mini RAID group, is configured based on a number of logical drives. Configuration of a RAID group includes selecting a RAID level and allocating a number of logical drives for data storage. The RAID level also dictates whether the RAID group is fault tolerant and how many drives are allowed to fail without risking data loss. During configuration, storage spaces on each of the logical drives are divided into fixed-size data units formed by one or more data blocks. Using the fixed data units as building blocks, a stripe group can be created by selecting a data unit from each of the logical drives and grouping the selected data units into the stripe group.

When using parity encoding as a failure recovery mechanism, one of the data units in a stripe group is dedicated to store parity information, generated from the rest of the data units in the same stripe group. To simplify, each of the data units in a stripe group is called a stripe unit, regardless whether it is used to store user data or parity information. Thus, a RAID group can be formed by multiple stripe groups, each of which contains a number of data units equal to the number of logical drives in the RAID group. After configuration, the RAID group can be presented as a single storage drive to external systems, and each of the stripe groups can be seen as a contiguous storage unit.

The stripe groups in the logical drives can then be implemented with multiple physical drives to form a parity declustered RAID organization. Parity declustered RAID organization can be formed by distributing a RAID group and its stripe groups, which are based on a number of logical drives, to a larger number of physical drives. For example, a parity declustered RAID organization configured with four logical drives may be distributed to five or more physical drives in a parity-declustered layout. Thus, not all physical drives are used to store the stripe units of a stripe group. Even though a parity declustered RAID organization does not directly provide I/O performance enhancement, its advantage is significant during failure recovery. When one or more of the physical drives fail, a data recovery process does not need to access all physical drives of the RAID organization in order to read the surviving stripe units of a stripe group. Thus, the performance of the RAID group during data reconstruction can be significantly improved. Physical drives that are not participating in the reconstruction of a stripe group can either participate in the recovery of another stripe group, or continue providing data services to clients.

In one embodiment, rather than reconstructing lost data on a newly replaced or a spare drive, distributed hot sparing (DHS) space can be reserved on each of the physical drives during RAID configuration. DHS is a technique where the reconstructed data is written to spare areas that are distributed across a number of drives. Thus, data reconstruction is no longer dependent on manual replacement of failed drives. Further, unlike writing to a dedicated replacement drive, DHS ensures that reconstruction is not bottlenecked by the bandwidth of a single writing drive. A DHS scheme, preferably, should ensure that all drives contain the same number of spare stripes units. And after the failed drives are reconstructed on the spare stripe units, there should be minimal wasted spare space left on the surviving drives.

In one embodiment, when one or more drives fail in a parity declustered RAID organization with DHS, the RAID organization can immediately start the reconstruction process. The reconstruction process identifies the failed drives, the affected stripe groups, and the lost stripe units. For each lost stripe unit, the complement physical drives that can store rebuilding stripe units are identified. Once complement drives have been identified for all stripe units, an algorithm can determine the least flexible (least options for storing stripe units and/or least spare space available) complement drives for the reconstruction, and arrange for the reconstruction of the stripe units on these drives first. The algorithm continues its rebuilding process stripe unit by stripe unit and drive by drive, until all lost data are restored on the hot spare space of the surviving drives.

The algorithm also maintains parity declustered organization of stripe units when recovering data to the spare space. Such approach ensures that reconstruction is not bottlenecked by the bandwidth of a limited number of drives. Rather, multiple stripe units can be concurrently rebuilt, thereby significantly shortening a RAID group's degraded mode period. In one embodiment, in addition to maintaining parity declustered organization after reconstructing a drive, distributed spare space is optimally allocated and evenly distributed among the drives. Thus, as long as the RAID configuration tolerates the drive failures, there will always be sufficient space available for reconstruction, without wasting precious storage space.

Refer now to FIG. 1, which shows a network storage environment in which the present invention can be implemented. In FIG. 1, a storage server 130 providers data storage services to a set of clients 110 via a network 120. The network 120 may be, for example, a local area network (LAN), wide area network (WAN), metropolitan area network (MAN), global area network such as the Internet, a Fibre Channel fabric, or any combination of such interconnects. Each of the clients 110 may be, for example, a conventional personal computer (PC), server-class computer, workstation, handheld computing or communication device, or the like.

In one embodiment, the storage server 130 can be a file-level server such as used in a NAS environment, a block-level storage server such as used in a SAN environment, or a storage server which is capable of providing both file-level and block-level service. Further, although the storage server 130 is illustrated as a single unit in FIG. 1, it can have a distributed architecture. For example, the storage server 130 can be implemented with multiple distributed storage servers. It can also include a physically separate network module (e.g., "N-module") and disk module (e.g., "D-module") (not shown), which communicate with other storage servers over an external interconnect. The N-module acts as a front-end of the storage server, exporting services to clients; and the D-module acts as the back-end, managing and implementing a parity-declustered distribution of a RAID organization on the underlying storage of the storage server. The N-module and D-module can be contained in separate housings and communicate with each other via network connections. Thus, the N-module and the D-module enable a storage server to be physically separated into multiple modules that can be distributed across a network. In one embodiment, a storage server 130 can include multiple N-modules and D-modules, each of the N-modules corresponding to one or more D-modules, and each of the D-modules corresponding to one or more N-modules.

In one embodiment, the storage server 130 includes one or more processors 131 and memory 133 connected via an interconnect 136. The interconnect 136 is an abstraction that represents any one or more separate physical buses, point-to-point connections, or both connected by appropriate bridges, adapters, or controllers. The interconnect 136, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 131 may include central processing units (CPUs) of the storage server 130 and, thus, control the overall operation of the storage server 130. In certain embodiments, the processor(s) 131 accomplish this by executing software or firmware stored in memory 133. The processor(s) 131 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 133 is or includes the main memory of the storage server 130. The memory 133 represents any form of random access memory (RAM), read-only memory (ROM), flash memory (as discussed above), or the like, or a combination of such devices. In use, the memory 133 may contain, among other things, a set of machine instructions 134 which, when executed by processor 131, causes the processor 131 to perform operations to implement embodiments of the present invention.

Also connected to the processor(s) 131 through the interconnect 136 are a network adapter 132 and a storage adapter 135. The network adapter 132 provides the storage server 130 with the ability to communicate with remote devices, such as clients 110, and/or other storage server 130 over the network 120 of FIG. 1, and may be, for example, an Ethernet adapter or Fibre Channel adapter. The storage adapter 135 allows the storage serve 130 to access the storage units 160 of a parity declustered RAID organization 150, and may be, for example, a Fibre Channel adapter, a SCSI adapter, an Ethernet adapter, or any Fibre Channel Protocol (FCP) and iSCSI protocol adapters.

In one embodiment, the storage server 130 manages a parity declustered RAID organization 150. The parity declustered RAID organization 150 contains multiple storage units 160 that include non-volatile mass storage devices (not shown), and utilizes more storage units 160 than the number of logical drives configured in a RAID organization. The storage server 130 receives and responds to various read and write requests from the clients 110, directed to data stored in or to be stored in the parity declustered RAID organization 150 and storage units 160. The storage units 160, or physical drives, can include, for example, conventional magnetic or optical disks or tape drives; alternatively, they can include non-volatile solid-state memory, such as flash memory. Further, each of the storage units 160 can include a portion of a logical or physical storage device. The detail of the parity declustered RAID organization 150 is further described below.

FIG. 2-A illustrates exemplary RAID groups and mini RAID groups, in accordance with certain embodiments of the present invention. A RAID group refers to a group of two or more physical drives or logical drives that can be presented as a single storage device. Configuration of a RAID group usually includes the selection of a RAID level, e.g., level 0, 1, 2, 3, 4, 5, or 6, etc., and the grouping of a number of logical drives for data redundancy and failover recovery. Depending on the RAID level, one or more of the RAID drives can fail without resulting data loss in the RAID group. In FIG. 2-A, each of the four drives 1-4 is a logical representation of a hard drive. And four logical drives drive 1-drive 4 can be configured as a single RAID group with a RAID level of 0, 1, 2, 3, 4, 5, or 6, etc.

In one embodiment, storage space on each of the logical drives can be divided into multiple data units. Each data unit has a pre-determined or fixed size of a disk block (e.g., 4 KB), multiple disk blocks, or other logical or physical storage entities. The multiple disk blocks in a data unit can be contiguous allocated or distributed in storage entities. Using the data units as building blocks, a RAID configuration can create a stripe group by selecting one data unit from each of the logical drives. Data units included in a stripe group can reside at the same location of each of the relative drives. For example, D1, D2, D3 and P of FIG. 2-A are four data units that are located at the same relative location of drive 1—drive 4, and can be grouped into a stripe group 210. Alternatively, data units at different relative locations of the drives may also be grouped into a stripe group.

In one embodiment, a RAID configuration, e.g., RAID level 4, or level 5, etc, utilizes parity information to guarantee data redundancy. In a parity stripe group 210 of FIG. 2-A, data sets D1, D2, D3 are used to store user data, and data set P is designated to store parity information. The parity information is generated, e.g., by cumulative XOR calculations, from data stored in non-parity units (data units), and can be used to reconstruct any one of the lost data units. For example, after parity information is generated for the parity stripe group 210 and stored in data unit P, upon failure recovery, D1 can be reconstructed by using data stored in D2, D3 and P; D2 can be reconstructed by using D1, D3 and P; D3 can be reconstructed by using D1, D2 and P. Since P can be calculated from D1, D2 and D3, stripe group 210 can tolerate the failure of any one of the four data units without incurring data loss.

Alternatively, if the four data units D1, D2, D3 and P form a mirroring stripe group 210, then the stripe group 210 may tolerate more than one data unit failure. For example, if data stored in drive 1 is mirrored (duplicated) to the other three drives, then the stripe group 210 can allow up to three drives failure. For the purpose of the present invention, each of the data units in a stripe group is called a stripe unit, regardless of whether the stripe group utilizes mirroring or striping, or the data unit contains data or parity information.

In one embodiment, a stripe group can be configured with any sizes and fault-tolerance characteristics. Thus, a stripe group can contain any number of data units, and/or any number of parity units. Further, a stripe group can be configured with hybrid or nested RAID levels. For example, a RAID level that provides mirroring can be combined with a RAID level with striping to further boost performance. After configuration, a RAID group, which is formed by multiple stripe groups, can be presented as a single storage drive. Also, each of the stripe groups in the RAID group can act as a single contiguous storage unit in the storage drive, or a storage unit distributed across the storage drive.

In one embodiment, a mini raid group 220 is a RAID organization formed by one or more stripe groups 210. Similar in characteristics and capabilities comparing to a regular RAID group, a mini RAID group can be configured utilizing data units selected from multiple drives. For example, stripe group 210 can by itself form a mini RAID group. Or, as illustrated in FIG. 2-A, a mini RAID group 220 can be configured with 8 stripe units, or two stripe groups, selected from the four drives. A mini RAID group becomes a regular RAID group when it includes all stripe groups located in the four drives. Utilizing mini RAID group is advantageous because it allows granulated implementation of a RAID system and intelligent space allocation. Also, a set of drives can be configured with multiple mini RAID groups, each containing the same or different number of stripe groups, and each implementing the same or different RAID levels.

FIG. 2-B illustrates a parity declustered RAID organization with distributed hot sparing. In FIG. 2-B, a mini RAID configuration 230 with 15 stripes units are configured based on three logical drives, drive A, drive B and drive C. The 15 stripes units form five stripe groups S1-S5. The mini RAID configuration 230 can be configured to implement any one of the RAID levels, and can provide redundancy and failure recovery capabilities. In one embodiment, the mini RAID configuration 230 can be implemented with three physical drives, each corresponding to one of the drives A, B and C. However, assuming the mini RAID configuration 230 tolerates one drive failure, during reconstructing of data in the failed drive, all the surviving drives must participate and be constantly accessed for contents. Since the mini RAID configuration 230 must continue serving client I/O requests, the performance and throughput of the mini RAID configuration 230 can be severely degraded during reconstruction of lost data.

In one embodiment, the mini RAID configuration 230 can be implemented with multiple physical drives to form a parity declustered RAID organization. Parity declustered RAID organization can be constructed by distributing a RAID group and its stripe groups to a larger number of physical drives. In other words, the physical drives are mapped to the RAID configuration's drives (which can be viewed as "logical" drives) with a larger than 1:1 ratio. Thus, in a parity-declustered layout, stripe units of a stripe group are distributed to some, but not all, of the physical drives. In FIG. 2-B's example, a mini RAID configuration 230 with three logical drives is parity declustered and implemented in a parity declustered RAID organization 240 with five physical drives. Each of the stripe groups S1-S5 is distributed to the three of the five physical drives. The end result is a declustered distribution of the mini RAID configuration 230 to the five physical drives. When the stripe groups are evenly distributed across the physical drives, the parity declustered RAID organization 240 ensures data access loads are uniformly allocated to each of the physical drives. Alternatively, a RAID organization may be parity declustered to multiple logical drives, which provides additional data storage abstraction.

During data recovery, a parity declustered RAID organization enables the distribution of the reconstruction load across a larger collection of physical drives, thereby reducing I/O bottlenecks which are commonly associated with RAID without parity declustering. When one of the five physical drives 1-5 in FIG. 2-B fails, reconstruction of a stripe group only requires the access of two of the surviving four drives. For example, when drive 3 failed, reconstructing of stripe group 51 requires drive 1 and drive 2. During reconstruction, drive 1 and drive 2 may be temporarily locked for retrieving the remaining stripe units of the stripe group S1. However, since drivers 4 and 5 are not participating in reconstruction of stripe group S1, they are free to serve user requests. Further, drives 4 and 5 can participate in the reconstruction of stripe group S5, concurrently and in parallel to the reconstruction of S1. Thus, the extra physical drives can help reduce reconstruction workloads, and in the meantime, improve I/O performance.

In one embodiment, data reconstruction can be initiated once the failed drive is either replaced, or a spare drive is activated and assigned as the reconstruction drive. Alternatively, each drive in a parity declustered RAID organization can reserve a portion of its data units for failure recovery. Such approach is referred to as distributed hot sparing (DHS). Compared to a separate hot sparing drive, DHS does not limit data write to this single drive, which is bound to cause I/O bottleneck. Instead, the reconstructed stripe units can be distributed to the sparing space of the remaining surviving drives. In the example of FIG. 2-B, each of the drives 1-5 reserves and pre-allocates two stripe units as hot spare space before the drives are activated for user data storage. During normal operations, the pre-allocated hot spare spaces of the drivers are not used to store any user data. Once one of the drives fails, data stored on the failed drive can be immediately rebuilt and stored on the spare space of the surviving drives, and the failed drive is not required to be replaced during data reconstruction. Further, in a DHS configuration, data reconstruction allows concurrent and/or parallel data writing, thereby achieving a performance better than reconstructing with a single spare drive.

In one embodiment, the reserved spare space on each of the drives is statically reserved. Statically reserving spare drive space means that the reservation is not depended on which drive has failed. To simplify the mapping and data management, a contiguous storage area with fixed drive offset can be configured as the spare space. Alternatively, the spare space on each of the drives can be dynamically reserved, depending on specific RAID configuration or redundancy requirements. For example, assuming a RAID group or a mini RAID group is originally designed for one drive failure, when its configuration is changed to allow two drive failures, the spare space requirement for all drives may be dynamically increased. Thus, as a part of RAID reconfiguration, additional spare space for each drive can be re-calculated and reserved. If contiguous space allocation is not possible, then any available space in the drives can be reserved as spare.

In one embodiment, upon the failure and reconstruction of the maximum number of drives that are allowed to fail, the spare space on all the surviving drives should be big enough to accommodate all the reconstructed data. After the reconstruction, any additional pre-allocated spare spaces on the surviving drives cannot be used for additional reconstruction purposes, and are therefore wasted. Thus, to avoid storage space waste, the hot spare spaces in the physical drives are optimally pre-allocated to make sure that no extra space is reserved beyond the required amount. The spare space can be optimally allocated based on factors such as the number of drives designed to fail, the size of a mini RAID group, and the number of mini RAID groups, etc. Assuming a RAID system with N physical drives can tolerate failure of F drives, and each drive has D data units for data, and S data units for spare space. Then optimally, $D*F$ data units can be lost and reconstructed in spare space of $(N-F)*S$, no more, no less. Since $D+S$ is the total data units for each of the drives, then a ratio of $(F/N)$ is the percentage of data units that should be reserved for spare space in order to recover F failed drives in an N-drive RAID configuration.

In one embodiment, a mini RAID group with R stripe units on each physical drive is defined and implemented in a N-drive parity declustered organization with F-drive recovery-ability. Thus, to optimize spare storage allocation, a number of mini parity-declustered RAID groups are combined into a contiguous storage space and their corresponding spare capacity is allocated as a contiguous area next to the data area. For each physical drive, the number of mini parity-declustered RAID groups (number of rotations) and the number of rows for the spare space can be computed as the following (LCM stands for lowest common multiplier function):

Num_of_Rotations=$LCM(R*F,N-F)/(R*F)$

Num_of_Rows_For_Spare=$LCM(R*F,N-F)/(N-F)$

Alternatively, based on the above calculated numbers, spare space and mini RAID groups can be allocated accordingly, regardless whether the allocation is contiguously or distributed on the physical drives.

FIG. 2-B illustrates a parity declustered RAID organization with DHS optimally allocated. In FIG. 2-B, a parity declustered RAID organization is configured with distributed hot sparing space reserved for two drive failures. For a total of 25 stripe units from physical drives 1-5, 10 of the stripe units are reserved as spare space. Upon failure of any one of the drives 1-5, the three stripe units from the failed drives can be rebuilt and redistributed to the remaining eight spare units. Upon failure of two drives, then six stripe units from the failed drives can be redistributed to the remaining six spare units without the replacement of any of the failed drives.

In one embodiment, a RAID organization remains parity declustered and/or fault-tolerant after the failed stripe units are distributed to the hot sparing space of the surviving drives. To maintain parity declustered and/or fault-tolerant organization after reconstruction, a specific algorithm is followed to ensure that no two stripe units from the same stripe group are stored in the same surviving drive. Otherwise, a failure of this particular surviving drive could render data in this particular stripe group unrecoverable. Detail of this algorithm is further discussed below.

Figure 3:
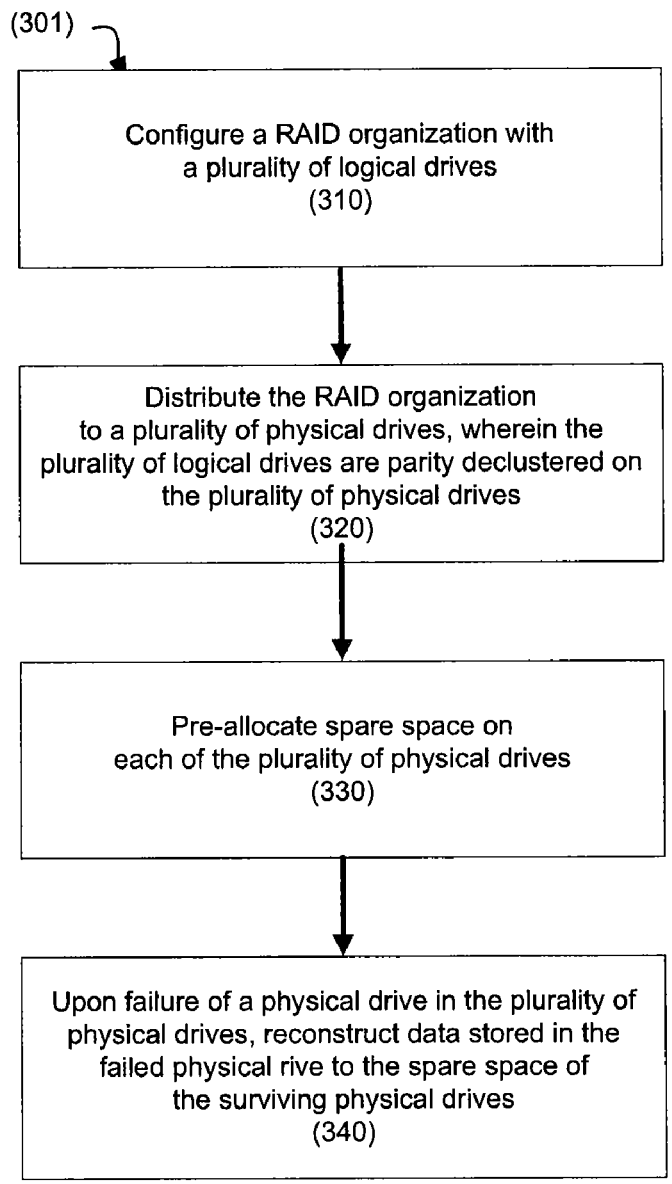
FIG. 3 illustrates a flow diagram of a process for configuring an efficient distributed hot sparing scheme in a parity declustered RAID organization

FIG. 3 illustrates a flow diagram of a process 301 for configuring an efficient distributed hot sparing scheme in a parity declustered RAID organization, in accordance with certain embodiments of the present invention. The process 301 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 301 can be stored in memory 133 of FIG. 1, executed by the processor 131 of FIG. 1, and/or implemented in a storage server 130 of FIG. 1. The process 301 can also operate logically between a file system manager and a storage driver layer in the storage server 130 of FIG. 1.

Referring back to FIG. 3, at 310, a RAID organization is configured with a plurality of logical drives. In one embodiment, the RAID organization is a mini RAID group which can include one or more stripe groups distributed among multiple logical drives. Logical drive refers to a logical storage entity that can be presented to external systems. Alternately, the RAID organization is a common RAID group. As a part of configuration, a RAID level, which includes, but is not limited to, 0, 1, 2, 3, 4, 5, or 6, etc, is selected. The RAID levels, which utilize mirroring and/or striping, can also be combined to form multiple levels of data redundancy and failure recovery. Further, a number of drive failures that can be tolerated without causing data loss is also determined. Upon completion, the configured RAID organization can be presented to client application as a volume, a disk, or any other storage entities. A user may also review and update a pre-configured RAID organization during run time.

At 320, the RAID organization configured at 310 is distributed to a plurality of physical drives. The number of physical drives is equal or greater than the number of logical drives. In one embodiment, a parity declustered RAID organization requires a larger number of physical drives than the number of logical drives. During configuration, stripe groups in the RAID organization are declustered, and the stripe units in each of the stripe groups are distributed, either manually or automatically by the storage server, to the physical drives. The algorithms for declustering parity groups and distributing stripe units are germane to the techniques introduced here. Still, any parity declustering algorithm should maintain proper RAID integrity by making sure that no two stripe units of a stripe group reside on the same drive. Also, the algorithm should promote even distribution of the stripe units among the physical drives, thereby taking advantage of the I/O bandwidth provided by the additional physical drives, and distributing reconstruction load across a large collection of physical drives.

At 330, distributed hot spare space is reserved in each of the physical drives. Reserving hot spare space allows immediate reconstructing and recovering of data upon drive failure. In one embodiment, reserved hot spare spaces are pre-allocated and grouped at certain sections of the physical drives. Alternatively, the space spaces can be statically or dynamically allocated upon requests. Such approach is advantageous since it allows flexible configuration of RAID organizations without interrupt of services. Based on pre-determined failure tolerance, the size of spare space on each drive can be optimized without wasting valuable drive resources. Still, as long as there are adequate spare space available, data reconstruction would not be affected.

At 340, one or more of the physical drives failures are detected by the RAID system. Drive failure may be caused by hardware malfunction. It may also be caused by loss of power or other external forces. A logical or physical drive can also be switched offline to trigger data reconstruction. In one embodiment, for each of the failed drives, stripe units on the drive are reconstructed and stored in the reserved hot spare space of the surviving drives. The details of distributing the reconstructed stripe units are further discussed below. Upon complete reconstruction of one of the failed drives, step 340 can be repeated for the rest of failed drives, until all data are reconstructed. Data reconstruction is further described below.

In one embodiment, a RAID configuration with N logical drives is parity-declustered to N+2, or even more, physical drives. In this case, after the failure of one physical drive, the RAID configuration still maintains at least one more physical drive than the number of logical drives. Thus, after distributing the reconstructed stripe units to the distributed hot spare space, the RAID configuration remains parity declustered. Once the number of physical drives is reduced to the number of logical drives, the RAID configuration is no longer parity declustered. However, such RAID group remains a fully functional fault-tolerant RAID system, which means any additional drive failure would only cause degrading of the performance, not data loss. In such a case, a hot or cold-swapped new physical drive, or a hot spare drive, may be used for data recovery. The RAID organization can then be brought back to its normal performance potential.

Figure 4:
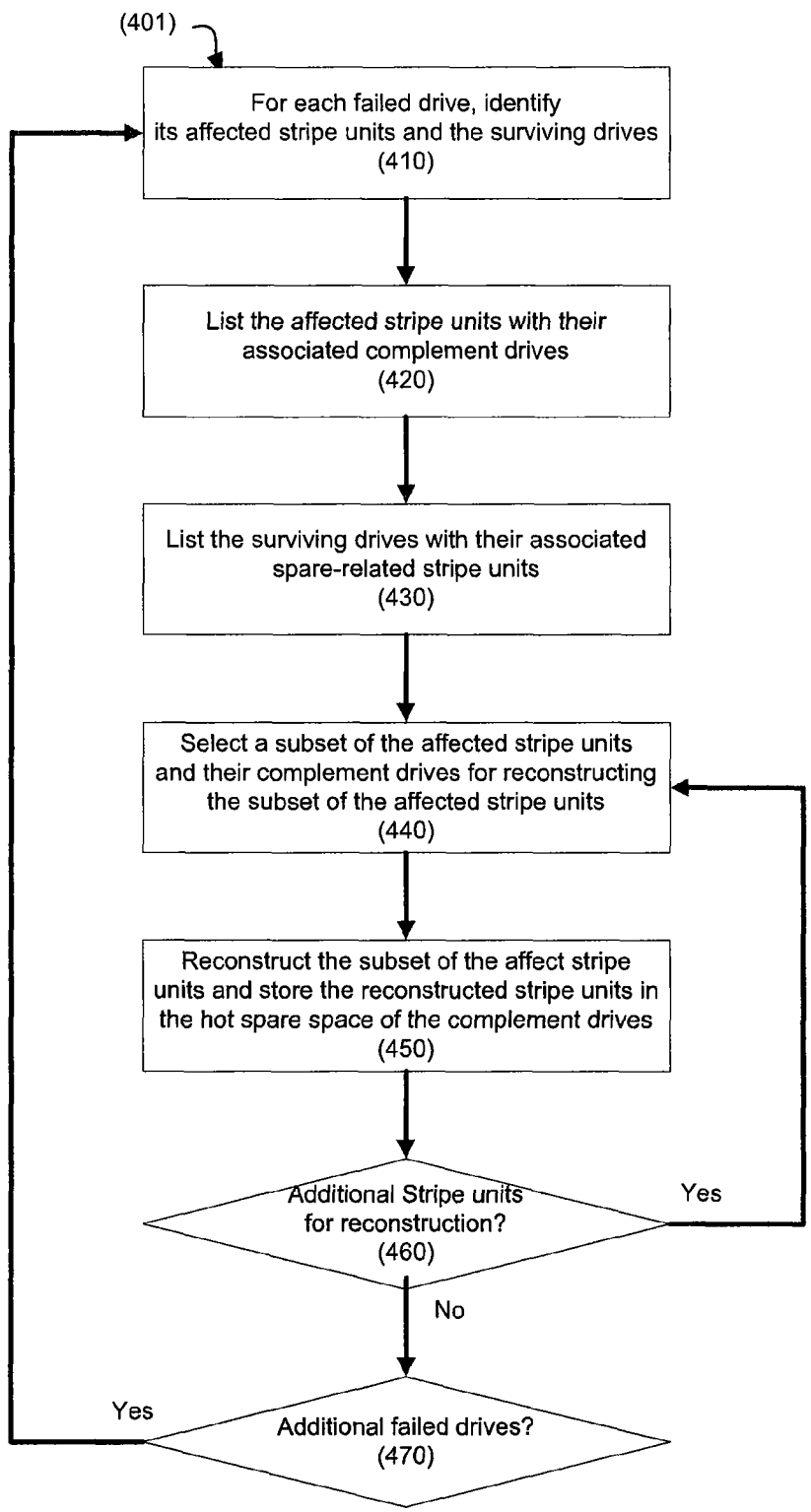
FIG. 4 illustrates a flow diagram of a process for distributing reconstructed stripe units to hot sparing space.

FIG. 4 illustrates a flow diagram of a process 401 for distributing reconstructed stripe units to hot sparing space, while maintaining a parity declustered RAID organization, in accordance with certain embodiments of the present invention. The process 401 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 401 can be stored in memory 133, executed by a processor 131, and/or implemented in a storage server 130 of FIG. 1.

Referring to FIG. 4, a parity declustered RAID organization is configured with multiple physical drives, each of which contains distributed hot sparing space. The parity declustered RAID organization can tolerate one or more drive failures. Upon failure of one or more of the drives, the storage server 130 of FIG. 1 can initiate process 401 to start data recovery. The storage server 130 can also initiate process 401 without drive failure. In one embodiment, the process 401 performs data reconstruction one failed drive at a time, until data from all failed drives are relocated to the distributed hot spare spaces. In this case, process 401 can either totally avoid allocating reconstructed units to the other failed drives, or pretend the other failed drives as healthy ones, and later move the temporarily allocated stripe units from the other failed drives to the healthy drives. Alternatively, the process 401 can reconstruct multiple failed drives at the same time.

At 410 of FIG. 4, after detecting the failure of one or more physical drives, process 401 identifies the surviving drives, which are healthy drives with available spare space that can be used for data reconstruction. In one embodiment, for each failed drive, its affected stripe units are identified. The affected stripe units include the failed drive's original units, plus the reconstructed units stored in the hot spare space of the drive. If multiple failed drives are processed together, the affected stripe units for all the failed drives are individually identified and group together for further processing.

At 420, based on the affected stripe units identified at 410, all complement drives are identified per affected stripe unit. The complement drives for a specific stripe unit are surviving drives that have spare space available, and can store the specific reconstructed stripe unit without violating the parity-declustering or data redundancy property of a RAID configuration. Thus, the complement drives do not participate in the stripe group of which the specific affected stripe unit is a member. Afterward, all affected stripe units with their associated complement drives are grouped into a stripe-unit-oriented list, which provides an overview of the reconstruction options available from the perspectives of the affected stripe units.

In one embodiment, at 430, each surviving drive's spare-related units, which are affected stripe units that can be reconstructed and saved to the surviving drive's spare space, are identified and group into a surviving-drive-oriented list. The spare-related units can be derived from the stripe-unit-oriented list generated at 420. For example, if an affected stripe unit has a complement drive, then the complement drive is a surviving drive having the affected stripe unit as one of the spare-related entities. The surviving-drive-oriented list provides an overview of the reconstruction options from the perspective of the surviving drives.

At 440, based on the stripe-unit-oriented list generated at 420, and/or the surviving-drive-oriented list generated at 430, process 401 selects some of the affected stripe units and the complement drives that can be used for reconstructing these affected stripe units. In one embodiment, process 401 selects the surviving drives that are the least flexible in receiving reconstructed stripe units, or the stripe units with the least options of complement drives. The least flexible surviving drives have the minimum number of assignable spare-related units, either because they lack spare space, or because they lack the flexibility in maintaining fault-tolerance. If more than one drive has the same minimum number of spare-related units, then these drives are equal in inflexibility. The stripe units with the least number of complement drives are also the least flexible in reconstruction. If more than one stripe unit has the same minimum number of complement drives, then these stripe units are equally inflexible, and can be equally selected for reconstruction. FIG. 6 further describes an embodiment of such selection in details.

At 450, the stripe units and their complement drives, all of which are selected at 440, can be used for reconstruction. The stripe group for one of the selected stripe units is located, and the rest of stripe units in this stripe group are identified. The selected stripe unit is recalculated based on the rest of stripe units of the stripe group. Afterward, the recalculated stripe unit is stored in a storage unit located in the complement drive's spare space. Alternatively, the recalculating and/or the storing of the recalculated stripe unit can be postponed until all the affected stripe units are assigned to their respective complement drives and spare locations.

At 460, an evaluation is conducted to see whether there are additional stripe units for reconstruction. If the answer is yes, then both the reconstructed stripe units and the surviving disk with no spare-related units are removed from the stripe-unit-oriented list and the surviving-drive-oriented list. Afterward, process 401 proceeds to 440 for the reconstruction of a different stripe unit. If the answer at 460 is no, then process 401 proceeds to 470 to evaluation whether there are additional failed drivers for reconstruction. If the answer is yes, then process 401 goes to 410. Otherwise, process 401 ends with all the stripe units on failed drivers reconstructed.

Thus, process 401 provides an optimal approach in maintaining parity declustered and/or fault-tolerant organization of a RAID organization during distributing of the reconstructed stripe units to the hot sparing spaces. This approach ensures that reconstruction process can be efficiently computed, and the reconstructed units are optimally distributed. The above approach also works for multiple drive failures. Alternatively, other algorithms can be used to accomplish the same or similar distribution of stripe units as long as they can maintain parity declustered and/or fault-tolerant storage organization. Also, during reconstruction, the algorithms should ensure that workloads be evenly distributed among the surviving drives. The algorithms may also utilize parallel-processing for concurrent reconstruction of stripe units.

Figure 5:
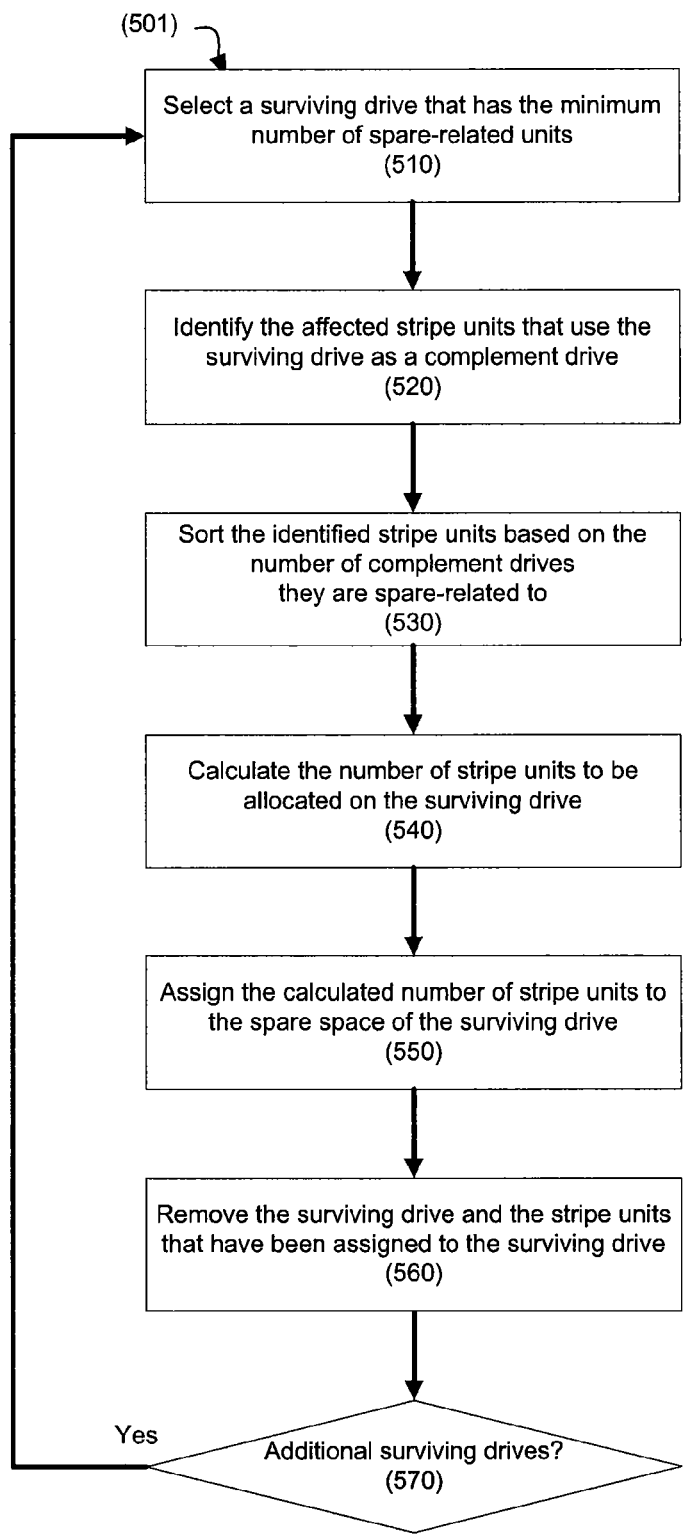
FIG. 5 illustrates a flow diagram of a process for selecting stripe units and surviving drives for distributing reconstructed data.

FIG. 5 illustrates a flow diagram of a process 501 for selecting stripe units and surviving drives for distributing reconstructed data, in accordance with certain embodiments of the present invention. The process 501 can be performed by processing logic that may comprise hardware (e.g., special-purpose circuitry, dedicated hardware logic, programmable hardware logic, etc.), software (such as instructions that can be executed on a processing device), firmware or a combination thereof. In one embodiment, machine-executable instructions for the process 501 can be stored in memory 133, executed by a processor 131, and/or implemented in a storage server 130 of FIG. 1.

Process 501 provides an embodiment in optimal assigning affected stripe units to their respective complement drives, as illustrated in 440 of FIG. 4. At 510, one of the surviving drives that have the minimum number of spare-related units is selected from the surviving-drive-oriented list. The selected surviving drive can be deemed the least flexible in accommodating the reconstructed data. At 520, all affected stripe units that use the selected surviving drive as one of the complement drives are identified. These identified stripe units can all, even though not necessarily, be relocated to the selected surviving drive's spare space At 530, the identified stripe units are sorted from the lowest to the highest based on the number of complement drives each of them is related to. The number of complement drives for each stripe unit can be ascertained based on the stripe-unit-oriented list. The stripe units with the lowest complement drives are the ones with the least relocation options.

At 540, for the least flexible surviving drive selected at 510, the maximum number of stripe units that can be allocated to its spare space is calculated. In one embodiment, to ensure that the reconstructed units are evenly distributed, for U number of unassigned stripe units to be distributed to N number of surviving drives, each surviving drive should not have more than U/N share of the reconstructed data. Thus, the maximum number of the stripe units can be the smaller one of the 1) number of spare-related units that can be assigned (ascertained at 520), and 2) the number U/N. At 550, the maximum number of stripe units can be selected from the sorted list generated at 530, and assigned to the surviving drive. At 560, the surviving drive and the stripe units assigned at 550 are removed from the surviving-drive-oriented list and the stripe-unit-oriented list. At 570, if there are additional surviving drives, process 501 proceeds to 510 for assignment of the next surviving drive.

FIG. 6 illustrates a drive reconstruction scenario, in accordance with certain embodiments of the present invention. A mini RAID group 240 of FIG. 2-B, which is configured as a parity-declustered RAID organization with distributed hot sparing, is illustrated in FIG. 6 as 610. When drive 3 fails, process 401 of FIG. 4 is initiated to reconstruct the failed stripe units on drive 3 to the hot spare space of the four surviving drives. Table 620 lists the stripe groups that are affected by the drive 3's failure. For each of the stripe groups S1, S3 and S5, the drives that contain its stripe units are also identified in table 620. Thus, drives 1, 2, and 3 contain stripe units for stripe group S1; drives 1, 3 and 5 contain stripe units for stripe group S3; and drives 3, 4, and 5 contain stripe units for stripe group S5.

In one embodiment, table 630 shows a stripe-unit-oriented list, which can be generated at step 420 of process 401. Thus, for the affected stripe units identified at step 410 of process 401, drives 4 and 5 are complement drives for stripe unit S1-3 (indicating from stripe group 1; originally located at drive 3); drives 2 and 4 are complement drives for stripe unit S3-3 (stripe group 3 at drive 3), and drives 1 and 2 are complement drives for stripe group S5-3 (stripe group 5 at drive 3). Table 640 shows a surviving-drive-oriented list generated at step 430 of process 401, which list each surviving drive's stripe-related units. In this case, drive 1 can be used for storing reconstructed stripe unit S5-3; drive 2 can be used for reconstructing stripe groups S3-3 and S5-3; drive 4 can be used for reconstructing stripe group S1-3 and S3-3; and drive 5 can be used for reconstructing stripe group S1-3.

In one embodiment, table 650 shows the outcome of performing step 440 of process 401. Alternatively, the generation of table 650 can be implemented by steps 510-570 of FIG. 5. At step 510, surviving drive 1 is identified to have the least spare-related units. At 520 and 530, only stripe unit S5-3 uses drive 1 as a complement drive. At 540, the maximum number of stripe units that should be allocated to drive 1 is one (1). At 550, stripe unit S5-3 is assigned to drive 1. At 560, drive 1 and stripe unit S5-3 are removed from tables 630 and 640. Afterward, steps 510-570 are repeated for the next least flexible surviving drives. Once all stripe units are assigned, table 650 shows the final assignment of the reconstructed data for all surviving drives.

After reconstructing and storing the stripe units identified in table 650, the RAID organization 660 shows a resulting distribution of the stripe groups and stripe units. In one embodiment, after failure recovery, the RAID organization 660, even though with one less drive, remains parity declustered with DHS. Although stripe units are stored in the space originally reserved as spare space, the remaining spare space of drives 1, 2, 4 and 5 stay reserved as hot spare space for the second failed drive, and no more data units can be added without a change in RAID configuration.

FIG. 7 illustrates a scenario based on FIG. 6, further including a second drive failure, in accordance with certain embodiments of the present invention. In one embodiment, drive 4 may fail after the failure recovery of drive 3, or it may fail at the same time as drive 3 does. Regardless, after assigning spare units on drives 1, 2, 4, and 5 to handle the failure of drive 3, process 401 of FIG. 4 repeats step 410 on drive 4. Afterward, table 720 shows the affected stripe groups of drive 4, identified as S1, S2, S4 and S5, and their associated drive designation. In table 720 drives 1, 2, and 4 contain stripe units for stripe group S1; drives 1, 2 and 4 contain stripe units for stripe group S2; drives 2, 4 and 5 contain stripe units for stripe group S4; and drives 1, 4, and 5 contain stripe units for stripe group S5. Please note that some of the stripe units in table 720 (in this case stripe unit corresponding to S1 on drive 4) are the reconstructed or replacement stripe units corresponding to the failed drive 3.

In one embodiment, table 730 shows a stripe-unit-oriented list generated at step 420 of process 401. And table 740 shows a surviving-drive-oriented list generated at step 430 of process 401. In table 730, stripe units S1-3 and S2-4 both have the same complement drive 5; stripe unit S4-4 has complement drive 1; and stripe unit S5-4 has complement drive 2. In table 740, surviving drive 1 can be used for storing reconstructed stripe unit S4-4; drive 2 can be used for reconstructing stripe unit S5-4; and drive 5 can be used for reconstructing stripe group S1-3 and S2-4.

In one embodiment, table 750 shows the outcome of performing step 440 of process 401. Alternatively, the generation of table 750 can be implemented by steps 510-570 of FIG. 5. In FIG. 7, based on table 740, both drive 1 and drive 2 have the minimum number of spare-related stripe units, and therefore are the least flexible drives. Because the maximum number of assignable stripe unit is one for drive 1, stripe unit S4-4 can be assigned to drive 1. Afterward, drive 1 and stripe unit S4-4 are taken off from the tables 730 and 740, and process 501 is repeated for the next least flexible drives. Table 750 shows a final assignment of stripe units to their respective surviving drives, in which stripe unit S5-4 is assigned to drive 2, and stripe units S1-3 and S2-4 are assigned to drive 5.

After reconstructing and storing the stripe units identified in table 750, all the hot spare space in the RAID organization 760 are used. Thus, after failure recovery, the RAID organization 760, which has a number of logical drives distributed to an equal number of physical drives, is no longer parity declustered with DHS. However, RAID organization 760 remains fault tolerant with data recovery capability. When the drive 3 and drive 4 are replaced, the RAID organization may again be modified to be parity declustered with DHS when some of the stripe units are moved to the replacement drives.

Thus, methods and systems for a parity declustered RAID organization with DHS have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
configuring a redundancy group with a plurality of logical drives, wherein the redundancy group provides data redundancy for a storage system;
distributing the redundancy group to a plurality of physical drives in the storage system, wherein the plurality of logical drives are distributed in a parity-declustered layout on the plurality of physical drives;
identifying a value of a maximum number of logical drives that are allowed to fail as indicated by a redundancy level associated with the configured redundancy group;
preallocating one or more units of spare space on each of the plurality of physical drives for use in failure recovery, wherein the number of units of spare space on each of the plurality of physical drives is dynamically allocated as a function of the identified value of the maximum number of logical drives as indicated by the redundancy level; and
upon failure of a first physical drive in the plurality of physical drives leaving remaining of the plurality of physical drives as surviving physical drives, reconstructing data stored in the failed first physical drive to the one or more units of spare space of the surviving physical drives, wherein after reconstruction, the plurality of logical drives remain in the parity-declustered layout on the surviving physical drives.

2. The method as recited in claim 1, further comprising:
replacing the failed first physical drive with another physical drive; and
moving data reconstructed in the spare space of the surviving physical drives to said another physical drive, wherein after moving, the redundancy group remains in the parity-declustered layout.

3. The method as recited in claim 1, further comprising:
upon failure of a second physical drive in the surviving physical drives leaving remaining of the surviving physical drives as additional surviving physical drives, reconstructing data stored in the failed second physical drive to spare space of the additional surviving physical drives, wherein the redundancy group remains capable of providing data redundancy for the storage system.

4. The method as recited in claim 1, wherein the spare space on each of the plurality of physical drives is optimally pre-allocated to store reconstructed data for a number of logical drives that are allowed to fail for the redundancy group.

5. The method as recited in claim 1, wherein a number the plurality of physical drives is greater than a number of the plurality of logical drives for the redundancy group.

6. The method as recited in claim 1, wherein, when the plurality of logical drives are distributed in the parity-declustered layout on the plurality of physical drives, the reconstructing of the data stored in the failed first physical drive does not concurrently-involve all the surviving physical drives.

7. The method as recited in claim 1, wherein the redundancy group is configured as a RAID organization.

8. The method as recited in claim 1, wherein the plurality of logical drives contain parity stripe groups.

9. The method as recited in claim 1, wherein the plurality of logical drives contain mirroring stripe groups.

10. The method as recited in claim 1, wherein the method is embodied in a machine-readable storage medium as a set of instructions which, when executed by a processor, cause the processor to perform the method.

11. A system, comprising:
a processor;
a plurality of physical drives; and
a memory coupled with the processor, the memory storing instructions which, when executed by the processor, cause the system to perform a process comprising;
configuring a RAID group with a plurality of logical drives, wherein the RAID group provides data redundancy for the system;
distributing the RAID group to the plurality of physical drives, wherein the plurality of logical drives are distributed in a parity-declustered layout on the plurality of physical drives;
identifying a value of a maximum number of logical drives that are allowed to fail as indicated by a redundancy level associated with the configured RAID group;
preallocating one or more units of spare space on each of the plurality of physical drives for use in failure recovery, wherein the number of units of spare space on each of the plurality of physical drives is dynamically allocated as a function of the identified value of the maximum number of logical drives as indicated by the redundancy level; and
upon failure of a first physical drive in the plurality of physical drives leaving remaining of the plurality of physical drives as surviving physical drives, reconstructing data stored in the failed first physical drive to the one or more units of spare space of the surviving physical drives, wherein after reconstruction, the plurality of logical drives remain in the parity-declustered layout on the surviving physical drives.

12. The system as recited in claim 11, wherein the process furtf comprises:
upon failure of a second physical drive in the surviving physical drives leaving remaining of the surviving physical drives as additional surviving physical drives, reconstructing data stored in the failed second physical drive to spare space of the additional surviving physical drives, wherein the RAID group remains capable of providing data redundancy for the system.

13. The system as recited in claim 11, wherein said reconstructing of data stored in the failed first physical drive can be parallel-processed by the system.

14. The system as recited in claim 11, wherein the data stored in the failed first physical drive contains a parity stripe unit for a parity group of the RAID group.

15. The system as recited in claim 11, wherein the spare space on each of the plurality of physical drives is optimally pre-allocated to store reconstructed data for a number of logical drives that are allowed to fail in the RAID group.

16. The system as recited in claim 11, wherein the process further comprising:

a storage adapter coupled with the processor, through which to access data stored in the plurality of physical drives, wherein the system is a network storage system.

\* \* \* \* \*